F. A. DEUNERT.
TIRE INFLATION MECHANISM.
APPLICATION FILED OCT. 23, 1908.

930,273. Patented Aug. 3, 1909.

Witnesses.
Jas. E. Dodge

Inventor
F. A. Deunert
his Attorneys

UNITED STATES PATENT OFFICE.

FREDRICK AUGUST DEUNERT, OF KYABRAM, VICTORIA, AUSTRALIA.

TIRE-INFLATION MECHANISM.

No. 930,273.     Specification of Letters Patent.     Patented Aug. 3, 1909.

Application filed October 23, 1908. Serial No. 459,221.

*To all whom it may concern:*

Be it known that I, FREDRICK AUGUST DEUNERT, a subject of the King of Great Britain and Ireland, &c., residing at Kyabram, in the State of Victoria, Commonwealth of Australia, have invented certain new and useful Improvements in Tire-Inflation Mechanism; and I do hereby declare the following to be a full, clear, and exact description of the invention, such as will enable others skilled in the art to which it appertains to make and use the same.

This invention relates to the inflation of pneumatic tires, and includes attachments for wheels having such tires. The motion of the wheel as it travels along the road will (as in other inventions) actuate when required an inflater, and when the tire has become inflated to the desired degree, a whistle will be sounded as a signal that the inflation may or should be stopped; if the tire happens to have a puncture the inflation may continue simultaneously with the leakage, and it may not become necessary to stop and repair the tire; nor is there stopping to inflate a non leaking tire.

In the details of this invention there are novel combinations of parts which result in practical utility, for certain strains the mechanism is subjected to are provided for; dust and dirt are prevented from interfering with efficiency; and the whole attachment is quickly removable, and replaceable when desired.

Figure 4:
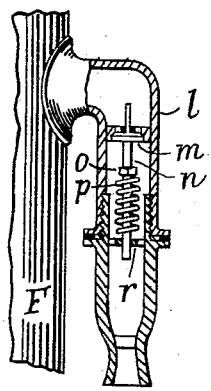
Figure 3:
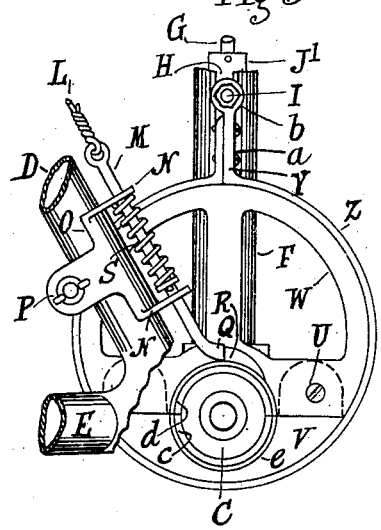
Figure 2:
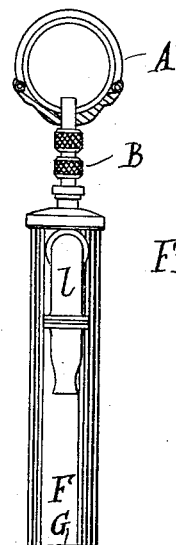
Figure 1:
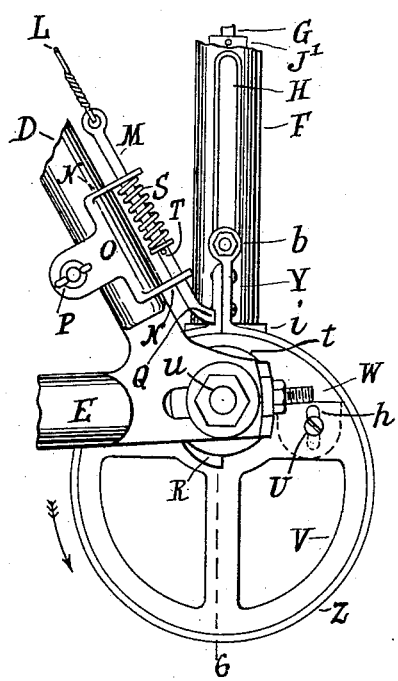

In the accompanying drawings Figure 1 represents a side view of parts of the mechanism, as fitted to a bicycle, the inflater being at rest, the direction of hub movement being indicated by an arrow. Fig. 2 is a rear elevation including the parts in Fig. 1 and showing the tire in section, also portions on line 6 of Fig. 1. Fig. 3 shows in side view, with part of the cycle frame broken away, some parts of Fig. 1 in the position they have when inflation is proceeding. In this view several parts over the eccentric at the wheel hub are omitted. Fig. 4 indicates on a larger scale, in longitudinal section, the alarm whistle.

In these drawings the tire is marked A, with valve B, or means to connect the air discharge end of the inflater.

C shows the wheel hub, and D, E are parts of the cycle frame.

F is a radially fixed inflater barrel, elongated to almost meet hub C.

G is the piston rod of the inflater.

The barrel has a longitudinal slot H in its hub end, the slot edges being ordinarily reinforced or thickened. The slot guides a pin I which extends into it, and connects by a nut or in suitable manner with rod G.

The air compressing piston on rod G is protected from whatever dirt enters slot H by a disk J fitting the barrel and fixed on the outer end of rod G. There is a plate J¹ of curved cross section within the barrel close to it, extending from disk J to a support on rod G. This plate is longer than slot H, as Fig. 2 shows. Parts J, J¹ move with rod G so that dirt can never enter the barrel slot at the tire end of disk J; any dirt that enters at the hub end will be blown or pushed out through the slot or one or more apertures F¹ at said hub end; what is not so discharged can be removed after the ride.

An aperture with removable cap or door K in the barrel, opposite to slot H is used to give ready access to the inner end of pin I to allow of removal or tightening of the nut or the like connecting that pin to the piston rod.

Barrel F has an open end near the hub secured by being entered into a cylindrical socket, *i*, projecting from a clip *k* which is taken off when desired as by removing a screw.

The cycle or car is fitted with, for each wheel, a wire or cord extending from any handle or the like convenient to the rider, toward the wheel hub in each case. The cord is for example, for hand operation connected to a handle near the ordinary cycle handle bar; or it is positioned elsewhere for actuation by the foot. L shows the lower end of such a wire or cord, connected to a clutch bar M which is set in guides so that it can be moved longitudinally. These guides are apertures in lugs N projecting from a clip O which is adjusted by being fixed to framing D in the desired position nearer to or farther from hub C. When fixed sufficiently far from the hub C it locates bar M so that the latter cannot come into action to cause inflation. The fixing means shown is a thumb screw P. The clutch bar lower end projects laterally—having a tooth Q, which at desired times engages or releases a stop R, one side of which is curved or oblique, formed upon the side of an eccentric wheel having segments V, W. This stop allows the cycle or car to run backward, the inflating action not then being producible.

Between lugs N, bar M carries a spring S one end of which abuts on one of said lugs. The other end abuts against a stop (as a washer supported by pin T) passing through or projecting from bar M. The spring when allowed to expand forces bar M downward, making tooth Q project into the path of stop R as the cycle travels forward, and locking the eccentric wheel so that the latter ceases to turn with hub C. This locked position is illustrated in Fig. 3. By giving an upward pull on wire L, however, bar M is lifted and tooth Q is held clear of stop R, allowing eccentric V, W, to revolve with hub C.

The inflater barrel is located in the middle of the wheel, (see Fig. 2); the eccentric is shown at one side outside the spokes where it may have a specially long stroke and be easily attended to.

The eccentric rim has a groove which is engaged by a metal band or strap Z, of T section. When the cycle is traveling and inflation is not proceeding the band does not move relatively to the eccentric, as both turn together. But when the eccentric is prevented from turning as in Fig. 3, the band revolves. Strap Z has projecting ends Y connected as by screws, a, one end Y being provided with an eye b, which connects with pin I which is fastened to piston rod G.

The eccentrically mounted wheel is readily put into working position or removed, without unshipping the bicycle wheel from its frame. One of its two segments, as W, has raised lugs X which project over and fit on parts of the other member V, screws U or the like being used to fasten the members together.

A bushing in two halves or arcs c, d, (free to rotate while inclosing the wheel hub) fits inside a circular aperture in the eccentric wheel. A broad flange e forms the perimeter of this aperture and has a circumferential recess f, while the bush c, d, has projecting ribs which fit said groove. The members of the eccentric hold the bush firmly but in some cases a counter-sunk set screw g (shown in Fig. 2 passing through part R) is added to bear on the bush.

A non-revolving dished cap t with a central aperture for the wheel axle u is fitted upon the outside of flange e, covering it in, and holding the hub cone v.

To promote fitting behind framing D, E, or the like of the eccentric and bush, slots h are provided at one side of each segment V, W. These allow loosening of the eccentric segments at that side and their separation sufficiently to enable the bush to be removed, and reinserted or a new one substituted.

The car or cycle would have each wheel fitted with this mechanism so that any wheel may be inflated independently. When a tire requires inflating the rider stops the revolution of the eccentric of that wheel, and the piston at once (as below explained) comes into action. Then when bar M is raised as in Fig. 1, the eccentric and strap revolve with the hub without reciprocating rod G, because the cycle wheel also revolves. Only when bar M is forced down by spring S does tooth Q arrest stop R, which is on the outside of flange e. This prevents the eccentric from revolving with the hub, but lets the strap revolve upon the eccentric as the cycle or car wheel turns, because the strap is fixed to piston rod G; consequently the strap actuates the inflater.

Connected to barrel F near the tire is an alarm whistle 1 which is also an air escape valve. This is adjusted to sound at predetermined air pressure within the tire A. The means of regulation shown comprise valve m with stem n carrying a lock nut o adjustable to compress a spring p which abuts against the nut and against a seating r (apertured). When the alarm sounds the rider will or may pull wire L thus causing the eccentric strap to cease to actuate the piston.

Some of the aforesaid details may be modified or omitted, while retaining matter of this invention.

What I claim as my invention and desire to secure by Letters Patent of the United States is:—

1. An apparatus of the character described, comprising an air pump having a cylindrical barrel slotted along one side, and radially disposed between the hub of the wheel and the tire, a connection between the outer end of the barrel and the interior of the tire, a piston and piston rod in said cylindrical barrel, a pin projecting through the slot in the side of said barrel and engaging said piston rod, a curved dust shield connected to said piston rod and engaging said pin and closing said slot in said barrel, means operated by the rotation of the wheel for reciprocating said pin, and means for throwing said pin-operating means into and out of engagement when desired, substantially as described.

2. An apparatus of the character described, comprising an air pump having a cylindrical barrel slotted along one side, and radially disposed between the hub of the wheel and the tire, a connection between the outer end of the barrel and the interior of the tire, a piston and piston rod in said cylindrical barrel, a pin projecting through the slot in the side of said barrel and engaging said piston rod, a curved dust shield connected to said piston rod and engaging said pin and closing said slot in said barrel, means operated by the rotation of the wheel for reciprocating said pin, comprising an eccentric carried by the wheel hub, and normally rotating therewith, a strap loose on said hub and connected to said pin, and means for locking said eccentric against rotation with said hub when desired, substantially as and for the purposes described.

3. An apparatus of the character described, comprising an air pump having a cylindrical barrel slotted along one side, and radially disposed between the hub of the wheel and the tire, a connection between the outer end of the barrel and the interior of the tire, a piston and piston rod in said cylindrical barrel, a pin projecting through the slot in the side of said barrel and engaging said piston rod, a curved dust shield connected to said piston rod and engaging said pin and closing said slot in said barrel, means operated by the rotation of the wheel for reciprocating said pin, comprising an eccentric carried by the wheel hub, and normally rotating therewith, a strap loose on said hub and connected to said pin, and means for locking said eccentric against rotation with said hub when desired, comprising a stop projecting from said eccentric, a spring-impressed pawl adapted to engage said stop, with means for withdrawing said stop against the action of said spring, substantially as and for the purposes described.

In testimony whereof, I affix my signature in presence of two witnesses.

FREDRICK AUGUST DEUNERT.

Witnesses:
   ALICE M. HOLT,
   BEATRICE M. LOWE.